No. 626,245. Patented June 6, 1899.
J. RICKS.
OVERSHOE FOR HORSES.
(Application filed Feb. 9, 1899.)
(No Model.)
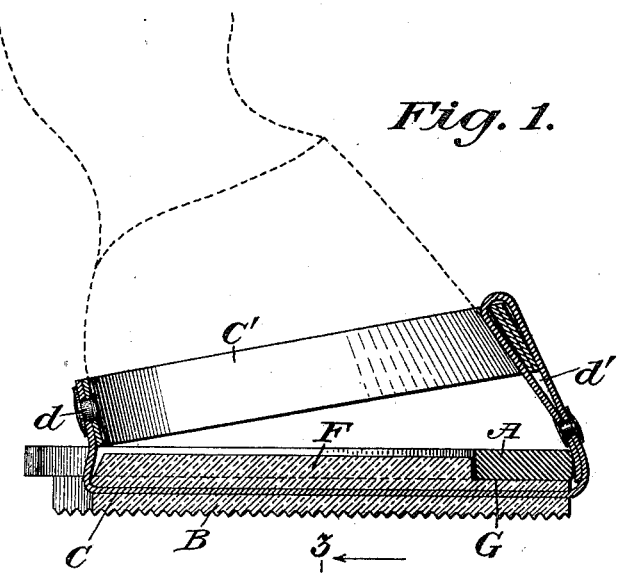
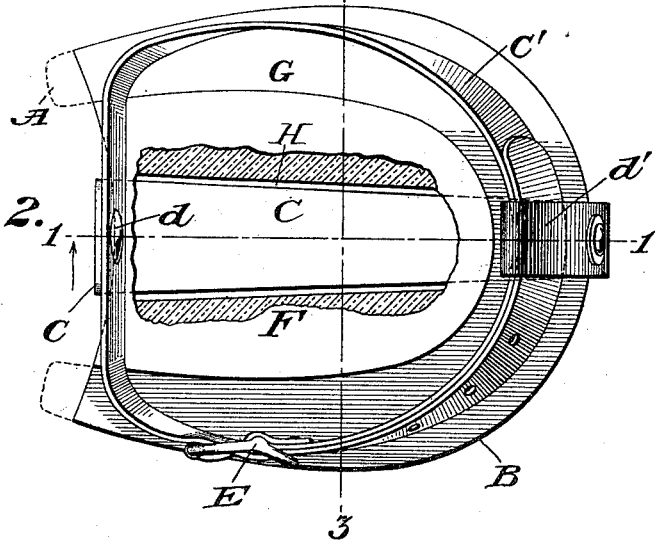
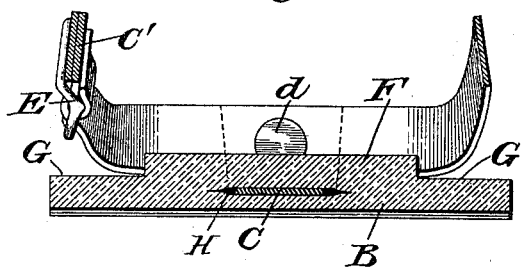
Witnesses
O. W. Smith
Wm. H. Richards
James Ricks
Inventor
By R. S. Smith
his Attorney

UNITED STATES PATENT OFFICE.

JAMES RICKS, OF WASHINGTON, DISTRICT OF COLUMBIA.

OVERSHOE FOR HORSES.

SPECIFICATION forming part of Letters Patent No. 626,245, dated June 6, 1899.

Application filed February 9, 1899. Serial No. 705,132. (No model.)

*To all whom it may concern:*

Be it known that I, JAMES RICKS, a citizen of the United States, residing in Washington, in the District of Columbia, have invented certain new and useful Improvements in Rubber Horseshoes; and I do hereby declare the following to be a full, clear, and exact description of the same.

My invention relates to the class of horseshoes used to prevent a horse from slipping in sleety weather and to secure noiseless travel when preferred and is applied over the shoe in common use. It consists of rubber and canvas and is so formed as to cover the entire bottom of the foot and is fastened to the hoof by means of a strap widening toward the heel and passing through a slot in the center of the overshoe, which slot also widens toward the heel, said strap being attached and looped to the strap buckled around the hoof.

The object of my invention is to produce an emergency sleet-overshoe at small cost which can be easily adjusted to any horseshoes in use for the prevention of slipping and for noiseless travel when preferred.

In the accompanying drawings, Figure 1 is a vertical central section, on line 1 1 of Fig. 2, of my improved overshoe applied to the horse's hoof. Fig. 2 is a top plan view of my improved overshoe removed from the hoof. Fig. 3 is a vertical section on the line 3 3 of Fig. 2, looking in direction of the arrow.

The rubber-and-canvas overshoe with rough outer surface not only prevents the horse from slipping in sleety weather, but prevents snow or ice or other substances from packing against any part of the foot and from pressing the shoe out of place and also prevents the balling up of snow, ice, or other substances in the frog of the foot, which would lessen the usefulness of the overshoe.

Some of the advantages of my improved overshoe are that it can be put on or taken off at will, it lessens the possibility of injury to the horse's foot, not being permanently attached, and it acts as a cushion to the horse's foot in traveling, making the tread soft and springy, giving horses the benefit of soft country roads. The U-shaped elevation on the upper surface of the overshoe, fitting within the metallic shoe, is an unfailing and durable cog, preventing the overshoe from slipping to either side and from twisting out of place. The wide-end strap, attached at the heel of the overshoe to the strap which passes around the hoof, said first-mentioned strap being passed through the wide-end slot in the center of the overshoe and having a loop at the toe end thereof for the reception of the strap which passes around the hoof and buckles at the side, secures the whole to the foot and prevents the overshoe from slipping forward or backward on the horse's foot when in use, while the overshoe prevents the horse from slipping in sleety weather and secures noiseless travel when preferred.

This invention is an overshoe for horses, which may be made by hand or molded of rubber and canvas at very small cost, owing to its simplicity of construction and the material out of which it is made—namely, a composition of rubber, canvas, and such like substances—which also increase its durability in service. It is adjusted and held to the foot by a wide-end strap passed through the wide-end slot in the center of the overshoe and attached at the heel to the strap which passes around the hoof, the other end of which first-mentioned strap forming at the toe of the overshoe a loop, through which the strap drawn around the hoof passes, buckling at the side.

I do not confine myself to the style of roughened surface indicated in the accompanying drawings nor to the exclusive use of rubber and canvas in the manufacture of my improved overshoe; but I reserve the right to make or cast it with transversed or corrugated or other roughened surface and to use a combination of rubber and canvas or other substances of like character in the manufacture thereof.

Like letters of reference designate like parts in the several figures.

A is the shoe in common use attached to the hoof of the animal.

B is the outer surface of my improved overshoe, which covers the entire bottom of the horse's foot, including the iron shoe A.

C is the strap, widening toward the heel and passing through the center of my improved overshoe, and C' is the strap passing around the hoof.

$d$ is the attachment by riveting or sewing the wide-end strap C to the strap C' at the heel.

$d'$ is the loop in strap C at the toe, through which the strap C' is passed.

E is the buckle which fastens the strap C' around the hoof.

F is the U-shaped elevated portion of the upper surface of my improved overshoe, fitting within the iron shoe A.

G is the outer upper surface of my improved overshoe, upon which rests the iron shoe A.

H is the slot, widening toward the heel, as shown in Fig. 2, by a slight breaking away of the upper surface of the center strap toward the heel, and is also shown in Fig. 3.

Having fully described my invention, what I claim, and desire to secure by Letters Patent, is—

1. A rubber-and-canvas overshoe for horses, covering the entire bottom of the horse's foot, including the shoe in common use, with wide-end slot H through center of overshoe from heel to toe, and the wide-end strap C passing through said wide-end slot H, and attached by the rivet $d$ at the heel of the overshoe to the strap C', which is drawn around the hoof, passing through loop $d'$ in said wide-end strap C, and fastened at the outer side of the hoof by the buckle E, substantially as set forth.

2. An emergency rubber-and-canvas overshoe for horses, with roughened under surface, covering the entire bottom of the horse's foot, including the iron shoe, with the U-shaped elevation F on the upper side thereof, adapted to fit within the metallic shoe, in combination with the wide-end strap C, passing longitudinally through the wide-end slot H in the bottom of the overshoe, and the strap C' buckling around the hoof at the side, substantially as set forth.

Subscribed this 7th day of February, A. D. 1899.

JAMES RICKS.

Witnesses:
JAMES F. BUNDY,
JOSEPH H. STEWART.